United States Patent
Cheng

(10) Patent No.: US 9,542,628 B2
(45) Date of Patent: Jan. 10, 2017

(54) IMAGE FORMING APPARATUS, NON-TRANSITORY COMPUTER-READABLE STORAGE MEDIUM STORING COMPUTER-READABLE INSTRUCTIONS, AND PRINTING APPARATUS

(71) Applicant: BROTHER KOGYO KABUSHIKI KAISHA, Nagoya-shi, Aichi-ken (JP)

(72) Inventor: Fei Cheng, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/666,396

(22) Filed: Mar. 24, 2015

(65) Prior Publication Data

US 2015/0278668 A1    Oct. 1, 2015

(30) Foreign Application Priority Data

Mar. 25, 2014  (JP) .................................. 2014-062122

(51) Int. Cl.
  *G06F 15/00*  (2006.01)
  *G06K 15/02*  (2006.01)

(52) U.S. Cl.
  CPC .................................. *G06K 15/186* (2013.01)

(58) Field of Classification Search
  CPC .................................................. G06K 15/4065
  USPC ....................................................... 358/1.15
  See application file for complete search history.

(56) References Cited

U.S. PATENT DOCUMENTS

| | | | | |
|---|---|---|---|---|
| 2004/0264992 A1* | 12/2004 | Shiraishi | ............ | G03G 15/2046 399/69 |
| 2005/0238373 A1 | 10/2005 | Takayanagi | | |
| 2007/0140751 A1* | 6/2007 | Eun | .................... | G03G 15/2028 399/322 |
| 2008/0131160 A1* | 6/2008 | Mitsuoka | ............ | G03G 15/5004 399/70 |
| 2014/0133878 A1* | 5/2014 | Okuzono | ............ | G03G 15/2046 399/69 |

FOREIGN PATENT DOCUMENTS

| | | | |
|---|---|---|---|
| JP | 2001-117474 A | 4/2001 | |
| JP | 2005-315966 A | 11/2005 | |

\* cited by examiner

*Primary Examiner* — Mark Milia
(74) *Attorney, Agent, or Firm* — Scully, Scott, Murphy & Presser, P.C.

(57) ABSTRACT

An image forming apparatus including an image forming unit and a controller causing the image forming unit to perform printing in printing periods after respective non-printing periods occurring alternately with the printing periods, determining a number of sheets to be printed in each of the printing periods in accordance with a number of sheets remaining to be printed in a print job, wherein, when printing periods include a first printing period and a second printing period, determining a number of sheets to be printed in the first printing period and determining a number of sheets to be printed in the second printing period which is in relation to the determined number of sheets to be printed in the first printing period, and determining a length of each of the non-printing periods in accordance with the determined number of sheets to be printed in each of the printing periods.

21 Claims, 14 Drawing Sheets

PLAIN PAPER

| NUMBER OF SHEETS TO BE PRINTED IN PRINTING PERIOD | LENGTH OF NON-PRINTING PERIOD | TIME REQUIRED FOR ONE CYCLE | AVERAGE TIME REQUIRED FOR PRINTING SINGLE SHEET IN ONE CYCLE |
|---|---|---|---|
| 1 | 12 | 16 | 16.00 |
| 2 | 17 | 25 | 12.50 |
| 3 | 21 | 33 | 11.00 |
| 4 | 24.5 | 40.5 | 10.13 |
| <u>5</u> | <u>30</u> | <u>50</u> | <u>10.00</u> |
| 6 | 40 | 64 | 10.67 |
| 7 | 46 | 74 | 10.57 |
| 8 | 50 | 82 | 10.25 |
| 9 | 55 | 91 | 10.11 |

Fig.4A

PLAIN PAPER

| NUMBER OF SHEETS TO BE PRINTED IN PRINTING PERIOD | LENGTH OF NON-PRINTING PERIOD | TIME REQUIRED FOR ONE CYCLE | AVERAGE TIME REQUIRED FOR PRINTING SINGLE SHEET IN ONE CYCLE |
|---|---|---|---|
| 1 | 12 | 16 | 16.00 |
| 2 | 17 | 25 | 12.50 |
| 3 | 21 | 33 | 11.00 |
| 4 | 24.5 | 40.5 | 10.13 |
| 5 | 30 | 50 | 10.00 |
| 6 | 40 | 64 | 10.67 |
| 7 | 46 | 74 | 10.57 |
| 8 | 50 | 82 | 10.25 |
| 9 | 55 | 91 | 10.11 |

Fig.4B

THICK PAPER

| NUMBER OF SHEETS TO BE PRINTED IN PRINTING PERIOD | LENGTH OF NON-PRINTING PERIOD | TIME REQUIRED FOR ONE CYCLE | AVERAGE TIME REQUIRED FOR PRINTING SINGLE SHEET IN ONE CYCLE |
|---|---|---|---|
| 1 | 13 | 20 | 20.00 |
| 2 | 22 | 36 | 18.50 |
| 3 | 31 | 52 | 17.33 |
| 4 | 40 | 68 | 17.00 |
| 5 | 52 | 87 | 17.40 |
| 6 | 64 | 106 | 17.67 |
| 7 | 76 | 125 | 17.86 |
| 8 | 88 | 144 | 18.00 |
| 9 | 100 | 163 | 18.11 |

Fig.5A

SIX SHEETS OF PLAIN PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 6 | 0 | <u>64</u> |
| 5 | 1 | 66 |
| 4 | 2 | 65.5 |
| 3 | 3 | 66 |

Fig.5B

SEVEN SHEETS OF PLAIN PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 7 | 0 | 74 |
| 6 | 1 | 80 |
| 5 | 2 | 75 |
| <u>4</u> | <u>3</u> | <u>73.5</u> |

Fig.5C

EIGHT SHEETS OF PLAIN PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 8 | 0 | 82 |
| 7 | 1 | 90 |
| 6 | 2 | 89 |
| 5 | 3 | 83 |
| <u>4</u> | 4 | <u>81</u> |

Fig.5D

NINE SHEETS OF PLAIN PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 9 | 0 | 91 |
| 8 | 1 | 98 |
| 7 | 2 | 99 |
| 6 | 3 | 977 |
| <u>5</u> | 4 | <u>90.5</u> |

Fig.8A

THREE SHEETS OF PLAIN PAPER AND THREE SHEETS OF THICK PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 6 | 0 | 106 |
| 5 | 1 | 107 |
| 4 | 2 | 104 |
| <u>3</u> | <u>3</u> | <u>85</u> |

Fig.8B

FOUR SHEETS OF PLAIN PAPER AND THREE SHEETS OF THICK PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 7 | 0 | 125 |
| 6 | 1 | 106 |
| 5 | 2 | 123 |
| <u>4</u> | <u>3</u> | <u>92.5</u> |

Fig.8C

FIVE SHEETS OF PLAIN PAPER AND THREE SHEETS OF THICK PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 8 | 0 | 144 |
| 7 | 1 | 145 |
| 6 | 2 | 142 |
| 5 | 3 | 102 |
| 4 | 4 | 108.5 |

Fig.8D

SIX SHEETS OF PLAIN PAPER AND THREE SHEETS OF THICK PAPER REMAINING

| NUMBER OF SHEETS TO BE PRINTED IN FIRST PRINTING PERIOD | NUMBER OF SHEETS TO BE PRINTED IN SECOND PRINTING PERIOD | REQUIRED TIME |
|---|---|---|
| 9 | 0 | 163 |
| 8 | 1 | 164 |
| 7 | 2 | 161 |
| 6 | 3 | 116 |
| 5 | 4 | 120 |

Fig.9

| NUMBER OF REMAINING SHEETS | | NUMBER OF SHEETS TO BE PRINTED IN FIRST PRINTING PERIOD | NUMBER OF SHEETS TO BE PRINTED IN SECOND PRINTING PERIOD |
|---|---|---|---|
| PLAIN PAPER | THICK PAPER | | |
| 6 | 0 | 6 | 0 |
| 7 | 0 | 4 | 3 |
| 8 | 0 | 4 | 4 |
| 9 | 0 | 5 | 4 |
| ... | ... | ... | ... |
| 3 | 3 | 3 | 3 |
| 4 | 3 | 4 | 3 |
| 5 | 3 | 5 | 3 |
| 6 | 3 | 6 | 3 |
| ... | ... | ... | ... |

321

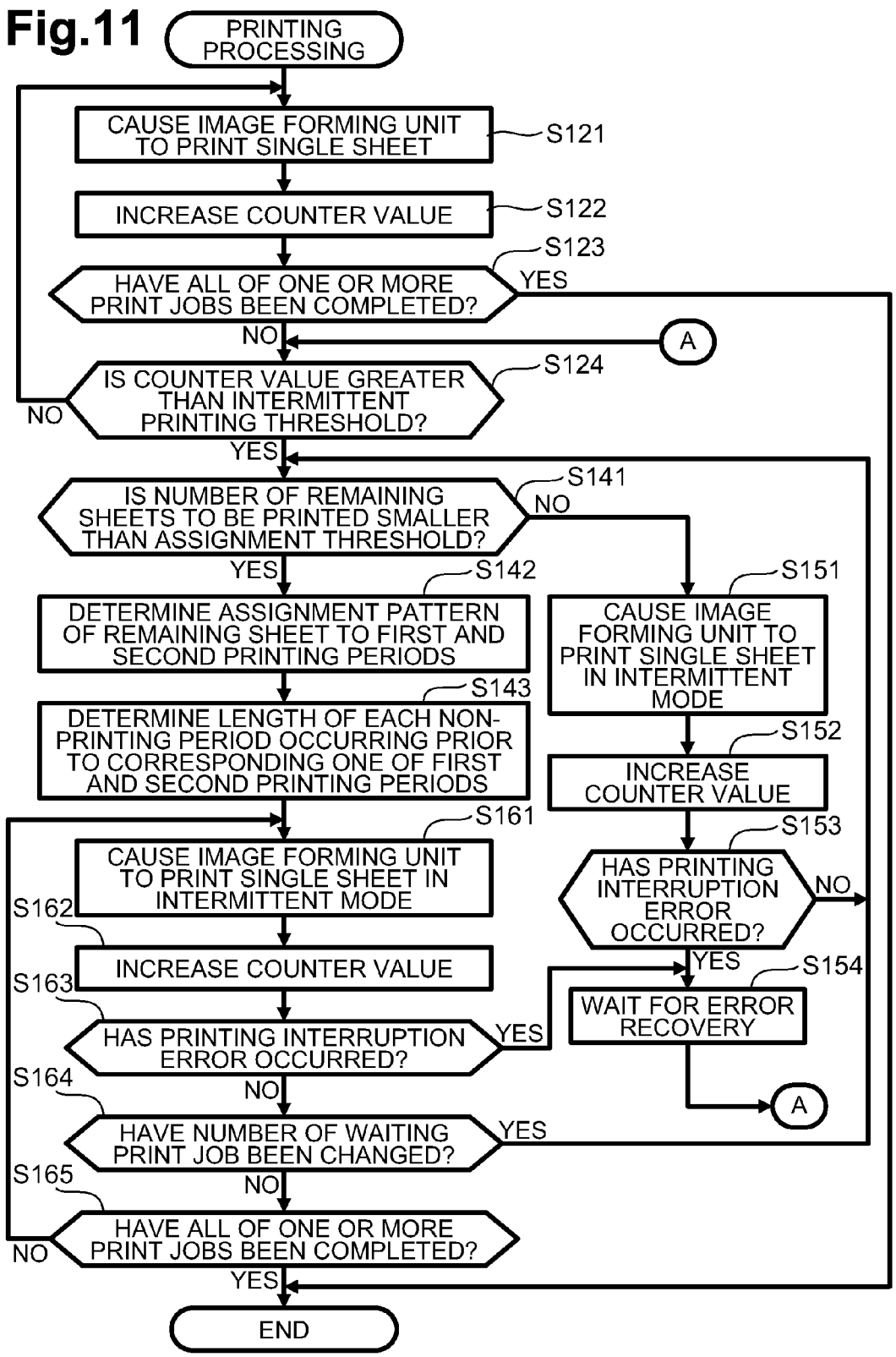

IMAGE FORMING APPARATUS, NON-TRANSITORY COMPUTER-READABLE STORAGE MEDIUM STORING COMPUTER-READABLE INSTRUCTIONS, AND PRINTING APPARATUS

CROSS-REFERENCE TO RELATED APPLICATION

This application claims priority from Japanese point Patent Application No. 2014-062122, filed on Mar. 25, 2014, which is incorporated herein by reference in its entirety.

TECHNICAL FIELD

Aspects described herein relate to an image forming apparatus, a non-transitory computer-readable storage medium storing computer-readable instructions, and a printing apparatus.

BACKGROUND

A known image forming apparatus performs intermittent printing in which a printing period during which printing is performed and a non-printing period during which printing is not performed are alternately repeated. The non-printing period, which is a certain time period for not performing printing, is provided after a printing period during which a predetermined number of sheets are printed successively. This arrangement enables, for example, restriction of increase in the internal temperature of the image forming apparatus.

The known image forming apparatus performs a printing operation in one of a continuous operation mode and an intermittent operation mode. When the internal temperature of the image forming apparatus reaches a specified temperature, the image forming apparatus changes its operating mode from the continuous operation mode to the intermittent operation mode.

SUMMARY

Nevertheless, intermittent printing may include a certain time period for waiting a start of a next printing period. Thus, a time may be required before intermittent printing is completed.

According to aspects of the present disclosure, an image forming apparatus is provided that includes an image forming unit and a controller configured to receive a print job, cause the image forming unit to perform printing in printing periods after respective non-printing periods during which the image forming unit does not perform printing, wherein the printing periods and the non-printing periods occur alternately; determine a number of sheets to be printed in each of the printing periods in accordance with a number of sheets remaining to be printed in the print job, wherein, when printing periods include a first printing period and a second printing period, the controller is configured to determine a number of sheets to be printed in the first printing period and is configured to determine a number of sheets to be printed in the second printing period which is in relation to the determined number of sheets to be printed in the first printing period; and determine a length of each of the non-printing periods in accordance with the determined number of sheets to be printed in each of the printing periods.

According to aspects of the present disclosure, further provided is a non-transitory computer-readable storage medium storing computer-readable instructions, the computer-readable instructions, when executed by a controller of an image forming apparatus comprising an image forming unit, receiving a print job, causes the controller to perform causing an image forming unit of the image forming apparatus to perform printing in printing periods after respective non-printing periods during which the image forming unit does not perform printing, wherein the printing periods and the non-printing periods occur alternately; determining a number of sheets to be printed in each of the printing periods in accordance with a number of sheets remaining to be printed in the print job, wherein, when printing periods include a first printing period and a second printing period, determining a number of sheets to be printed in the first printing period and determining a number of sheets to be printed in the second printing period which is in relation to the determined number of sheets to be printed in the first printing period, and determining a length of each of the non-printing periods in accordance with the determined number of sheets to be printed in each of the printing periods.

According to aspects of the present disclosure, further provided is a printing apparatus comprising a printing device configured to perform printing of a plurality of sheets in an intermittent printing mode in which the plurality of sheets are printed within two or more of a variable printing cycle, wherein the variable printing cycle comprises a non-printing period having a variable length during which the printing device does not perform printing, and a printing period subsequent to the non-printing period, wherein in the printing period the printing device prints a variable number of the plurality of sheets, and a controller configured to perform an assignment pattern determination process for assigning one pattern of a plurality of patterns for the printing device to print the plurality of sheets within the two or more of the variable printing cycle, wherein a required time for performing printing of the plurality of sheets under each of the plurality of patterns varies based on a first number of sheets to be printed in a printing period of a first variable printing cycle, a second number of sheets to be printed in a printing period of a second variable printing cycle, a length of a non-printing period of the first variable printing cycle, and a length of a non-printing period of the second variable printing cycle, and wherein the controller is configured to assign the one pattern of the plurality of patterns such that the one pattern has the shortest required time for performing printing of the plurality of sheets amongst the required times for performing printing under the plurality of patterns.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 4A is a chart showing the number of sheets to be printed in a printing period, the length of a non-printing period, the length of time required for one cycle, and the length of time required for printing a single sheet in each case when one or more sheets to be used are plain paper in the illustrative embodiment according to one or more aspects of the disclosure.

FIG. 4B is a chart showing the number of sheets to be printed M a printing period, the length of a non-printing period, the length of time required for one cycle, and the length of time required for printing a single sheet in each case when one or more sheets to be used are thick paper in the illustrative embodiment according to one or more aspects of the disclosure.

FIGS. 5A, 5B, 5C, and 5D are tables each showing each assignment pattern of remaining sheets and the length of time required for printing all the remaining sheets in each assignment pattern when a particular number of sheets remain and the remaining sheets are all plain paper in the illustrative embodiment according to one or more aspects of the disclosure.

FIGS. 8A, 8B, 8C, and 8D are tables each showing each assignment pattern of remaining sheets and the length of time required for printing all the remaining sheets in each assignment pattern when a particular number of sheets remain and the remaining sheets includes one or more sheets of thick paper in the illustrative embodiment according to one or more aspects of the disclosure.

FIG. 9 depicts an example configuration of an assignment pattern database storing assignment patterns according to the number of remaining sheets in the printer in the illustrative embodiment according to one or more aspects of the disclosure.

FIG. 11 is a flowchart depicting printing processing in the illustrative embodiment according to one or more aspects of the disclosure.

DETAILED DESCRIPTION

An image forming apparatus according to the aspects of the disclosure will be described in detail with reference to the accompanying drawings. In an illustrative embodiment, the aspects of the disclosure may be applied to a printer capable of performing intermittent printing.

Figure 1:
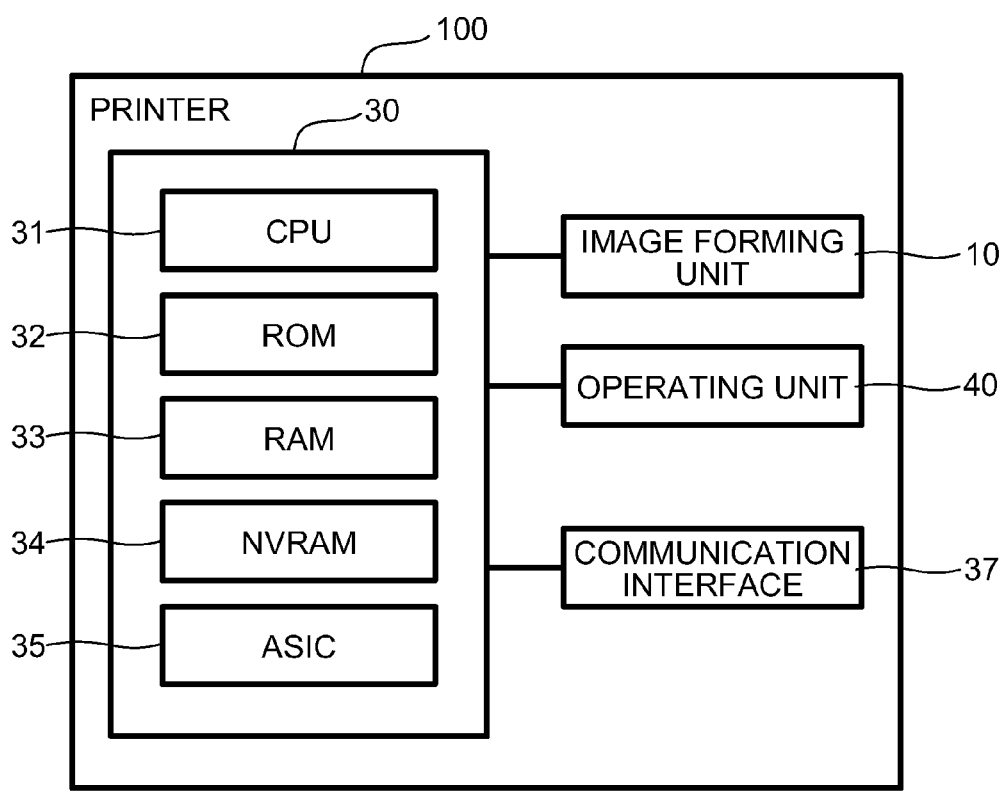
FIG. 1 is a block diagram depicting an electrical configuration of a printer in an illustrative embodiment according to one or more aspects of the disclosure.

As depicted in FIG. 1, a printer 100 includes a controller 30 including a central processing unit ("CPU") 31, a read-only memory ("ROM") 32, a random-access memory ("RAM") 33, a nonvolatile RAM ("NVRAM") 34, and an application-specific integrated circuit ("ASIC") 35. The printer 100 further includes an image forming unit 10, an operating unit 40, and a communication interface 37, which are controlled by the CPU 31. The image forming unit 10 forms an image using an electrophotographic method. The operating unit 40 accepts user's inputs. The communication interface 37 allows the printer 100 to connect to an external device. The controller 30 of FIG. 1 may include one or more hardware used for controlling the printer 100, such as the CPU 31. That is, the controller 30 might not include only single hardware actually included in the printer 100 but also include two or more hardware.

The ROM 32 stores various settings and firmware such as various control programs (e.g., computer-readable instructions) for controlling the printer 100 (e.g., instructing the CPU 31 to perform or control certain processing), as well as certain initial values. The RAM 33 is used as a workspace for temporarily storing the control programs read from the ROM 32 and storage areas for temporarily storing data.

The CPU 31 controls components of the printer 100 while storing processing results in the RAM 33 or the NVRAM 34, in response to one or more of executing various programs read from the ROM 32, executing the programs read from the NVRAM 34, and receiving signals sent from sensors. The CPU 31 is an example of a controller. The controller may include one or both of the controller 30 and the ASIC 35.

The communication interface 37 may be hardware that enables the printer 100 to perform communication with an external device. More specifically, the communication interface 37 may include, for example, a wired local-area network ("LAN") interface, a wireless LAN interface, a serial communication interface, a parallel communication interface, and a facsimile interface. The printer 100 is configured to receive a print job for causing the image forming unit 10 to form an image, from an external device via the communication interface 37.

The operating unit 40 is disposed at the exterior of the printer 100. The operating unit 40 includes one or more buttons for accepting user's inputs and a touch panel for displaying messages and/or details of setting. The buttons may include, for example, an execution button for inputting an instruction to cause the image forming unit 10 to perform image formation and a cancel button for inputting an instruction to cancel the performance of image formation. The operating unit 40 accepts various inputs from a user through the touch panel.

Figure 2:
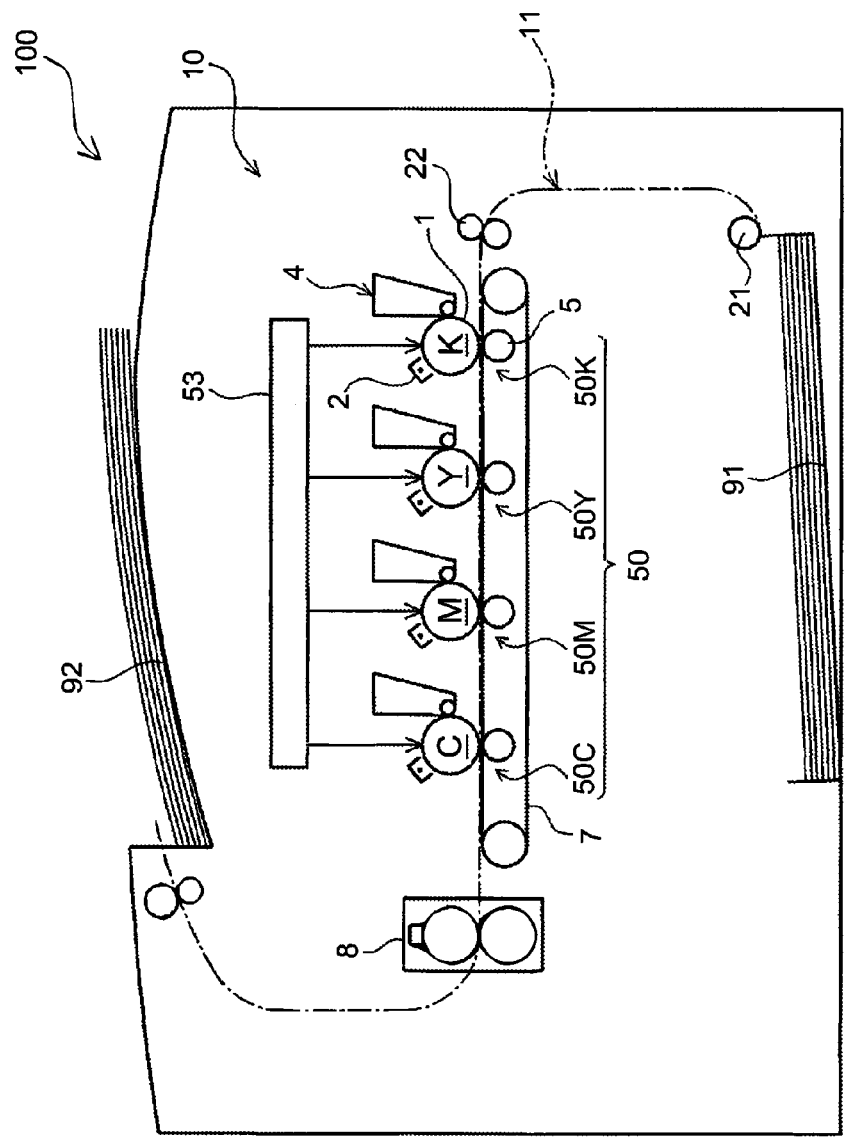
FIG. 2 is a sectional view depicting an internal configuration of the printer of FIG. 1 in the illustrative embodiment according to one or more aspects of the disclosure.

Referring to FIG. 2, a configuration of the image forming unit 10 of the printer 100 will be described. The image forming unit 10 includes a process section 50, an exposure unit 53, a fixing unit 8, a feed tray 91, a discharge tray 92, and a conveyor belt 7. The process section 50 forms one or more toner images using the electrophotographic method and transfers the one or more toner images onto a sheet. The exposure unit 53 irradiates the process section 50 with light. The fixing unit 8 fixes toner of one or more toner images onto a sheet. The feed tray 91 supports one or more sheets, each of which has no image transferred thereon. The discharge tray 92 supports one or more sheets, each of which has an image transferred thereon. The conveyor belt 7 conveys a sheet to each of one or more transfer positions where the process section 50 transfers one or more images onto the sheet.

The printer 100 includes a conveyance path 11 (indicated by a dotted-and-dashed line in FIG. 2) having a generally S shape. The conveyance path 11 is defined by a feed roller 21, a registration roller 22, the process section 50, and the fixing unit 8 and extends from the feed tray 91 to the discharge tray 92. The feed tray 91 is disposed in the bottom of the printer 100, and the discharge tray 92 is disposed at the top of the printer 100. One or more sheets supported by the feed tray 91 are fed one by one and conveyed to the discharge tray 92 via the feed roller 21, the registration roller 22, the process section 50, and the fixing unit 8.

The process section 50 is capable of forming a color image and includes a plurality of process units corresponding to respective colors of cyan (C), magenta (M), yellow (Y), and black (K) aligned side by side. More specifically, the process section 50 includes a process unit 50C for forming an image in cyan (C), a process unit 50M for forming an image in magenta (M), a process unit 50Y for forming an image in yellow (Y), and a process unit 50K for forming an image in black (K). The process units 50C, 50M, 50Y, and 50K are arranged at regular intervals in this order from downstream in a sheet conveying direction. Nevertheless, the order in which the process units 50C, 50M, 50Y, and 50K are arranged is not limited to that example.

The process unit 50K includes a drum-shaped photosensitive body 1, a charger 2, a developing unit 4, and a transfer unit 5. The charger 2 charges a surface of the photosensitive body 1 uniformly. The developing unit 4 develops an electrostatic latent image formed on the surface of the photosensitive body 1, using toner, to form a toner image thereon. The transfer unit 5 transfers the toner image onto a sheet or a surface of the conveyor belt 7 from the surface of the photosensitive body 1. The photosensitive body 1 and the transfer unit 5 are in contact with respective surfaces of the conveyor belt 7. The photosensitive body 1 faces the transfer unit 5 across the conveyor belt 7. The process units 50C, 50M, and 50Y have the same configuration as the process unit 50K.

In each of the process units 50C, 50M, 50Y, and 50K, the charger 2 charges the surface of the photosensitive body 1 uniformly. Then, the surface of the photosensitive body 1 is exposed with light from the exposure unit 53. Thus, an electrostatic latent image for an image to be formed onto a sheet is formed on the surface of the photosensitive body 1. Thereafter, the developing unit 4 supplies toner onto the surface of the photosensitive body 1 to visualize the electrostatic latent image formed on the photosensitive body 1. Thus, a toner image is formed on the surface of the photosensitive body 1.

The image forming unit 10 picks up, one by one, one or more sheets from the feed tray 91 and conveys the picked sheet onto the surface of the conveyor belt 7. Then, the process section 50 transfers one or more toner images onto the sheet carried by the surface of the conveyor belt 7. In color printing, each of the process units 50C, 50M, 50Y, and 50K forms a toner image in one of colors of cyan (C), magenta (M), yellow (Y), and black (K) and transfers the toner image onto a sheet while the toner images are laid on top of one another. In monochrome printing, only the process unit 50K forms a toner image in black and transfers the toner image onto a sheet. After the one or more toner images are transferred onto the sheet, the image forming unit 10 conveys the sheet having the one or more toner images transferred thereon to the fixing unit 8 to fix the one or more toner images on the sheet by heat. Then, the image forming unit 10 discharges, onto the discharge tray 92, the one or more sheets having the fixed one or more toner images.

Hereinafter, intermittent printing performed by the printer 100 will be described. The printer 100 has an intermittent mode and a non-intermittent mode. In the intermittent mode, the printer 100 performs a printing operation while alternately repeating a printing period during which printing is performed and a non-printing period during which printing is not performed. In the non-intermittent mode, the printer 100 performs a printing operation without including any non-printing period. The intermittent mode includes a non-printing period that occurs between printing periods. Therefore, when the printer 100 performs a printing operation in the intermittent mode, increase in the internal temperature of the printer 100 may be restricted as compared with a case where the printer 100 performs a printing operation in the non-intermittent mode.

A maximum number of sheets available to be printed (e.g. an upper limit to the number of sheets to be printed) in a printing period is determined. Printing of one or more sheets up to the upper limit is permitted in a printing period. A printing period may be a period during which printing is permitted. The printing period includes a time period during which printing is not performed in order to provide spacing between successive sheets during printing of a plurality of sheets. A non-printing period may be a period during which printing is not permitted. The length of a non-printing period may be variable and may be determined appropriate for the number of sheets to be printed assigned to a printing period that occurs subsequent to the non-printing period. The non-printing period includes a time period for preparation for printing (e.g. a next printing period), for example, a time period for warm-up of a heater of the fixing unit 8.

In most cases, the internal temperature of the printer 100 may be relatively low at the beginning of a printing operation, and therefore, the printer 100 performs a printing operation in the non-intermittent mode. As the printer 100 prints one or more sheets, the heater of the fixing unit 8 causes the internal temperature of the printer 100 to rise.

The controller 30 estimates the internal temperature of the printer 100. A value of the counter indicating an estimated internal temperature of the printer 100 (hereinafter, referred to as "counter value") is stored in one of the RAM 33 and the NVRAM 34. At the time of turning on the printer 100, the counter value is set to an initial value. The counter value is increased by a specified amount every time a single sheet is printed. As the heater of the fixing unit 8 stops generating heat, the internal temperature of the printer 100 lowers. Therefore, while the heater of the fixing unit 8 stops generating heat, the counter value is decreased by a specified amount periodically. When the counter value exceeds an intermittent printing threshold, the printer 100 changes its operating mode from the non-intermittent mode to the intermittent mode in order to prevent the further rise of the internal temperature of the printer 100. The intermittent printing threshold may be a level at which the printer 100 changes its operating mode from the non-intermittent mode to the intermittent mode.

Figure 3:
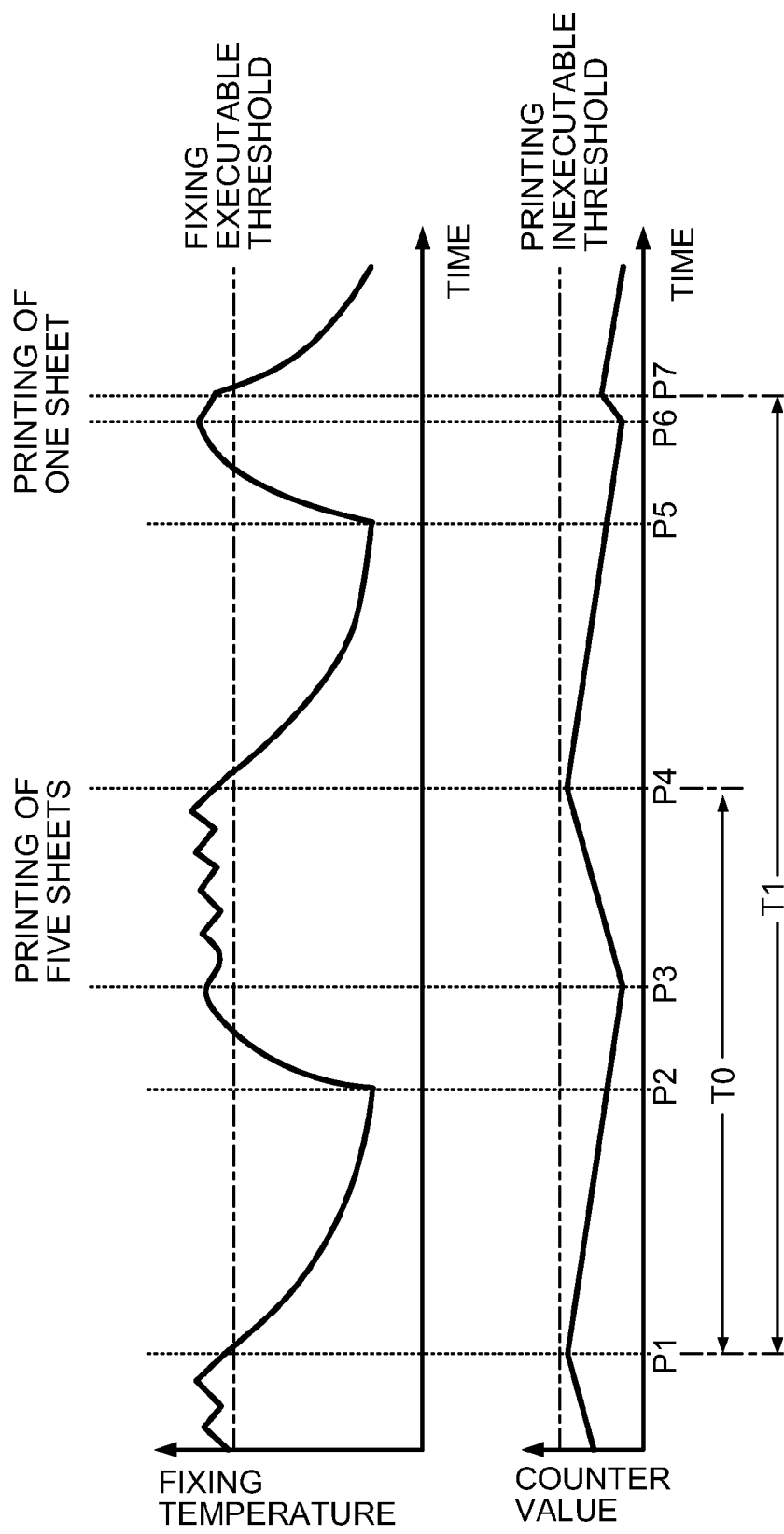
FIG. 3 is a chart showing changes in fixing temperature and counter value in an intermittent mode over time in the illustrative embodiment according to one or more aspects of the disclosure, where the length of a non-printing period is fixed.

More specifically, FIG. 3 is a chart showing changes in fixing temperature and counter value in the intermittent mode over time. The fixing temperature may be a surface temperature of a heat roller of the fixing unit 8. The chart in FIG. 3 shows the changes in fixing temperature and counter value in the intermittent mode over time when the number of sheets to be printed in a printing period is set to five sheets fixedly, the non-printing period is set to 30 seconds, and there are six sheets remaining to be printed.

In FIG. 3, point P1 indicates the time when a particular printing period ends, that is, the time when printing of the fifth sheet of the five sheets assigned to the particular printing period is completed. The fixing temperature is controlled so as to be kept exceeding a fixing executable threshold during a printing period. The fixing executable threshold may be a lower limit of the fixing temperature that the fixing unit 8 is available to perform fixing of one or more images on a sheet. When a sheet passes the heating roller of the fixing unit 8, the sheet absorbs heat from the surface of the heating roller, thereby causing change in fixing temperature of the surface of the heating roller during a printing period.

During a printing period, the counter value is increased by a specified amount every time a single sheet is printed. For example, when four seconds are required for printing a single sheet, the counter value is increased by a specified amount every four seconds. In other embodiments, for example, the counter value may be increased by a fixed amount every time regardless of a sheet type and a sheet conveying speed or may be increased by a different amount every time in accordance with the sheet type and the sheet conveying speed.

After point P1, during a period between point P1 and point P2, the heater of the fixing unit 8 stops generating heat to lower the fixing temperature of the surface of the heat roller. Then, during a period between point P2 and point P3, the heater of the fixing unit 8 generates heat to raise the fixing temperature to or above the fixing executable threshold again for the next printing period. That is, the period between point P1 and point P2 corresponds to a cooling period for cooling the internal temperature of the printer 100, and the period between point P2 and point P3 corresponds to a warm-up period for preheating the heater of the fixing unit 8. During the period between point P1 and point P3, printing is not performed. Therefore, the period between point P1 and point P3 corresponds to a non-printing period.

During a non-printing period, the counter value is decreased by a specified amount periodically. For example, the counter value may be decreased by a specified amount every six seconds while printing is not performed.

After point P3, a printing period occurs and the printer 100 prints five sheets of the remaining six sheets successively in this printing period. During this printing period (e.g., the period between point P3 and point P4), the counter value is increased by a specified amount again repeatedly. The printer 100 determines the length of a non-printing period (e.g., the period between point P1 and point P3) occurring prior to a printing period such that the counter value does not exceed a printing inexecutable threshold during the printing period. A period including a printing period and a non-printing period may be a one cycle length in intermittent printing T0 in the intermittent mode. That is, the period between point P1 and point P4 corresponds to the one cycle length in intermittent printing T0. The printing inexecutable threshold may be an upper limit of the counter value that execution of printing is permitted.

After point P4, a non-printing period occurs for preparing for another printing period. That is, a cooling period (e.g., a period between point P4 and point P5) and a warm-up period (e.g., a period between point P5 and point P6) occur prior to the upcoming printing period. After point P6, the printer 100 prints one sheet (e.g., the last sheet) of the remaining six sheets in the printing period. A point P7 may be the time when printing of the last sheet of the remaining sheets is completed. That is, the time required for printing all of the remaining six sheets may be the length of a period from point P1 to point P7, which is a time required for printing all remaining sheets T1 (hereinafter, referred to as "required time T1"). The required time T1 may be a total time of a first non-printing period, a first printing period (e.g., a period for printing one or more sheets of the remaining sheets), a second non-printing period, and a second printing period (e.g., a period for printing the remainder of the remaining sheets).

The number of sheets that requires the shortest time for printing a single sheet is determined as the number of sheets to be printed in a printing period. FIG. 4A shows a minimum length of a non-printing period for each number of sheets to be printed in a printing period in the printer 100 according to the illustrative embodiment in a case where all of one or more sheets are plain paper. FIG. 4B shows a minimum length of a non-printing period for each number of sheets to be printed in a printing period in the printer 100 according to the illustrative embodiment in a case where all of one or more sheets are thick paper. The values indicated in FIGS. 4A and 4B may be experimental values or design values. In the printer 100 according to the illustrative embodiment, the time required for printing a single sheet of plain paper may be, for example, four seconds, and the time required for printing a single sheet of thick paper may be, for example, seven seconds.

In the example case where all of one or more sheets are plain paper (refer to FIG. 4A), when the number of sheets to be printed in a printing period is set to one sheet, 12 seconds are required for a non-printing period and the time required for printing a single sheet may be 16 seconds (=time required for one cycle (e.g., 16 seconds=non-printing period (e.g., 12 seconds)+printing period (e.g., one sheet×4 seconds))/one sheet). When the number of sheets to be printed in a printing period is set to two sheets, the time required for printing a single sheet may be 12.50 seconds (=time required for one cycle (e.g., 25 seconds=non-printing period (e.g., 17 seconds)+printing period (e.g., two sheets×4 seconds))/two sheets). Similarly, when the number of sheets to be printed in a printing period is set to five sheets, the time required for printing a single sheet may be 10.00 seconds (=time required for one cycle (e.g., 50 seconds=non-printing period (e.g., 30 seconds)+printing period (e.g., five sheets×4 seconds))/five sheets).

As depicted in the example case of FIG. 4A, in the printer 100 according to the illustrative embodiment, the number of sheets to be printed in a printing period that requires the shortest time for printing a single sheet of plain paper may be five sheets. Thus, when the printer 100 performs printing one or more sheets of plain paper in the intermittent mode, the number of sheets to be printed in a printing period is set to five sheets.

In the example case where all of one or more sheets are thick paper (refer to FIG. 4B), when the number of sheets to be printed in a printing period is set to five sheets, the time required for printing a single sheet may be 17.40 seconds. When the number of sheets to be printed in a printing period is set to four sheets, the time required for printing a single sheet may be 17.00 seconds, which is shorter than the case where the number of sheets to be printed in a printing period is set to five sheets. In the printer 100 according to the illustrative embodiment, when the number of sheets to be printed in a printing period is set to four sheets, the time required for printing a single sheet is the shortest. Thus, when the printer 100 performs printing one or more sheets of thick paper in the intermittent mode, the number of sheets to be printed in a printing period is set to four sheets.

As depicted in the cases of FIGS. 4A and 4B, an appropriate number of sheets to be assigned to a printing period as the number of sheets to be printed in a printing period and an appropriate length of a non-printing period for each number of sheets to be printed in a printing period may be different in accordance with the sheet type. Therefore, the printer 100 determines the number of sheets to be printed in a printing period and the length of a non-printing period on a sheet type basis.

A manner of determining the number of sheets to be printed in a printing period and the length of a non-printing period when the number of remaining sheets to be printed is less than a particular threshold will be described. When the number of remaining sheets to be printed is greater than or equal to the particular threshold, as described above, the number of sheets to be printed in a printing period is set to a certain fixed value that indicates the number of sheets that requires the shortest time for printing a single sheet. Under this condition, a non-printing period and a printing period repeat alternately. The non-printing period has a particular length appropriate to the determined number of sheets to be printed in a printing period. The printing period has a particular length for printing the determined number of sheets to be printed in the printing period. Therefore, this manner enables reduction of the required time T1. When the number of remaining sheets to be printed is less than the particular threshold, the number of sheets to be printed in a printing period and the length of a non-printing period are determined based on the number of remaining sheets to be printed. This manner may enable further reduction of the required time T1.

For example, as depicted in FIG. 3, when the length of a non-printing period is set to a certain fixed value and there are six sheets remaining to be printed, the required time T1 (e.g. a period between P1 and P7) may be, for example, 84 seconds, which is a sum of the time required for one cycle in intermittent printing T0 when five sheets are printed in a first printing period (e.g., 50 seconds (e.g. a period between P1 and P4)), the length of a non-printing period appropriate to a second printing period for printing five sheets (e.g., 30 seconds (e.g., a period between P4 and P6)), and the time required for printing a single sheet in the second printing period (e.g., 4 seconds (e.g., a period between P6 and P7)). When the length of the non-printing period is variable and is changed to another value that indicates a non-printing period appropriate to the second printing period for printing one sheet (e.g., 12 seconds (e.g., the period between P4 and P6)) from the value that indicates the non-printing period appropriate to the printing period for printing five sheets (e.g., 30 seconds (e.g., the period between P4 and P6)), the required time T1 may be reduced to 66 seconds. That is, the required time T1 may be reduced by 18 seconds.

In a case where there are six sheets remaining to be printed and the maximum number of sheets to be printed in a printing period is set to five sheets fixedly, an assignment pattern of remaining sheets to subsequent printing periods (e.g., a first printing period and a second printing period) is limited to a particular pattern in which five sheets of the six remaining sheets are assigned to a first printing period and the other one sheet is assigned to a second printing period. However, if the counter value do not exceed the printing inexecutable threshold, the printer 100 may be able to perform printing while four sheets of the six remaining sheets are assigned to the first printing period and the other two sheets are assigned to the second printing period or while three sheets of the six remaining sheets are assigned to the first printing period and the other three sheets are assigned to the second printing period. In other embodiments, for example, the printer 100 may perform printing of all of the remaining six sheets in a single printing period (e.g., in the first printing period). The assignment pattern of remaining sheets to subsequent printing periods indicates how many sheets of remaining sheets to be printed are assigned to each of subsequent printing periods.

FIG. 5A is a table showing the required time T1 for each assignment pattern of remaining sheets to a first printing period and a second printing period when there are six sheets of plain paper remaining to be printed. The values each indicating the required time T1 are experimental values. When five sheets of the six remaining sheets are assigned to a first printing period and the other one sheet is assigned to a second printing period, the required time T1 in this assignment pattern may be, for example, 66 seconds as described above.

Figure 6:
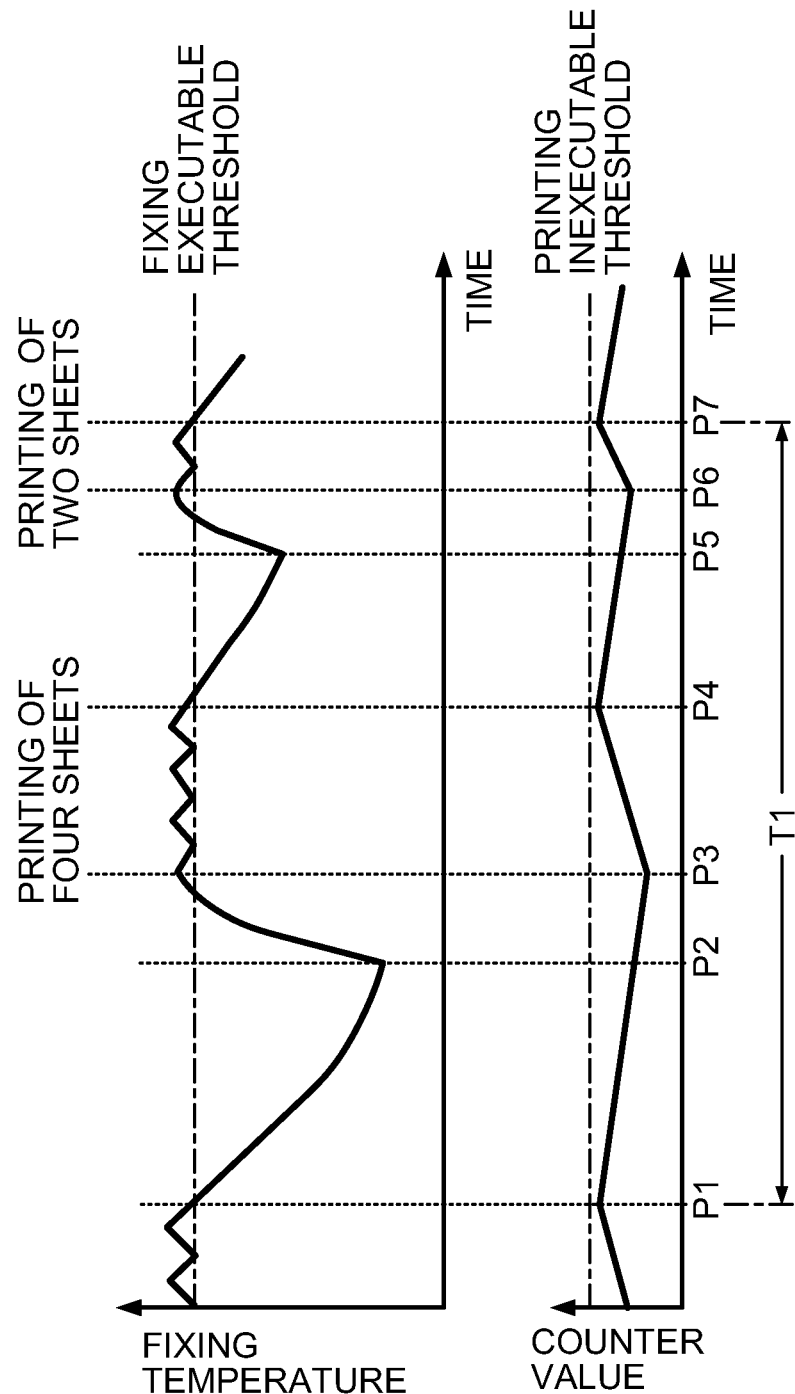
FIG. 6 is a chart showing changes in fixing temperature and counter value when four sheets of the six remaining sheets are assigned to a first printing period and the other two sheets of the six remaining sheets are assigned to a second printing period in the illustrative embodiment according to one or more aspects of the disclosure, where the length of the non-printing period is variable.

When four sheets of the six remaining sheets are assigned to a first printing period and the other two sheets are assigned to a second printing period, the required time T1 in this assignment pattern may be, for example, 65.5 seconds. FIG. 6 is a chart showing changes in fixing temperature and counter value when the remaining sheets are assigned to each printing period in this assignment pattern. In this case, 24.5 seconds are required for a non-printing period (e.g., a period between P1 and P3) (refer to FIG. 4A) prior to the first printing period for printing four sheets of the six remaining sheets (e.g., a period between P3 and P4). Further, 17 seconds are required for a non-printing period (e.g., a period between P4 and P6) (refer to FIG. 4A) prior to the second printing period for printing the other two sheets of the six remaining sheets (e.g., a period between P6 and P7). The total length of the first and second printing periods for printing six sheets may be 24 seconds. Thus, the required time T1 in this assignment pattern may be, for example, 65.5 seconds, which is slightly shorter than the required time T1 when five sheets of the six remaining sheet are assigned to the first printing period and the other one sheet is assigned to the second printing period.

Figure 7:
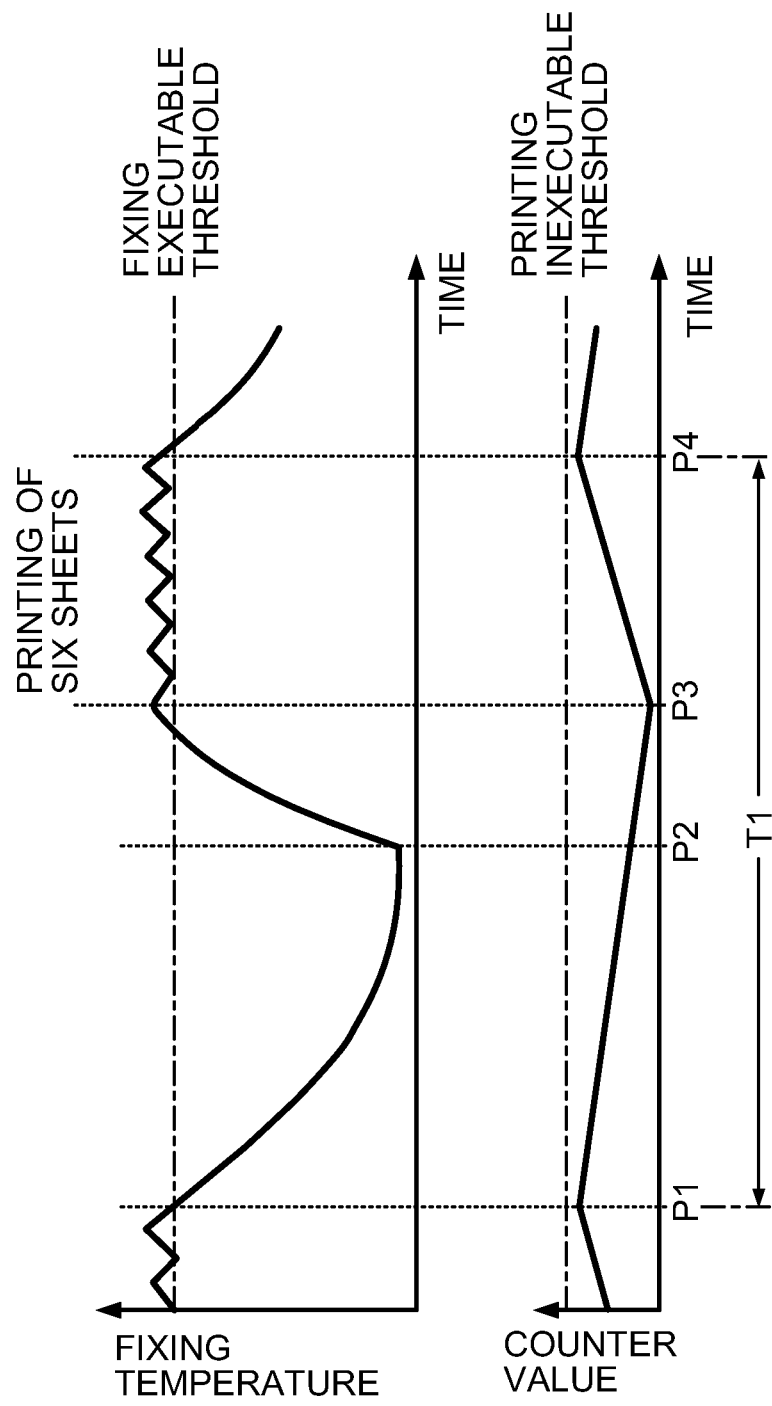
FIG. 7 is a chart showing changes in fixing temperature and counter value when six sheets of the six remaining sheets are assigned to a first printing period and no sheet is assigned to a second printing period in the illustrative embodiment according to one or more aspects of the disclosure, where the length of the non-printing period is variable.

When all six sheets of the remaining sheets are assigned to a first printing period and no sheet is assigned to a second printing period, the required time T1 in this assignment pattern may be, for example, 64 seconds. FIG. 7 is a chart showing changes in fixing temperature and counter value when the remaining sheets are assigned to subsequent printing periods in this assignment pattern. In this case, 40 seconds are required for a non-printing period (e.g., a period between P1 and P3) (refer to FIG. 4A) prior to the first printing period for printing all the six sheets of the six remaining sheets (e.g., a period between P3 and P4), and 24 seconds are required for the first printing period for printing all the six sheets of the six remaining sheets (e.g., a period between P3 and P4). Thus, the required time T1 in this assignment pattern may be, for example, 64 seconds, which is further shorter than the required time T1 when four sheets of the six remaining sheets are assigned to the first printing period and the other two sheets are assigned to the second printing period. That is, in the case where there are six sheets remaining to be printed, the assignment pattern in which six sheets are assigned to a first printing period and no sheet is assigned to a second printing period may make the required time T1 the shortest.

Likewise, FIG. 5B is a table showing the required time T1 for each assignment pattern of remaining sheets to a first printing period and a second printing period when there are seven sheets of plain paper remaining to be printed. FIG. 5C is a table showing the required time T1 for each assignment pattern of remaining sheets to a first printing period and a second printing period when there are eight sheets of plain paper remaining to be printed. FIG. 5D is a table showing the required time T1 for each assignment pattern of remaining sheets to a first printing period and a second printing period when there are nine sheets of plain paper remaining to be printed. The values each indicating the required time T1 in FIGS. 5B, 5C, and 5D are experimental values.

For example, in a case where there are seven sheets remaining sheets to be printed and the maximum number of sheets to be printed is set to five sheets fixedly, five sheets of the seven remaining sheets are assigned to a first printing period and the other two sheets are assigned to a second printing period, and thus, the required time T1 in this assignment pattern may be, for example, 75 seconds. When four sheets of the seven remaining sheets are assigned to the first printing period and the other three sheets are assigned to the second printing period, the required time T1 in this assignment pattern may be, for example, 73.5 seconds. As compared with the former assignment pattern, the required time T1 is reduced in the latter assignment pattern. As described above, an appropriate assignment pattern of remaining sheets to subsequent printing periods (e.g., a first printing period and a second printing period) is different depending on the number of remaining sheets to be printed.

When the remaining sheets includes one or more sheets of thick paper, an appropriate assignment pattern may be different from the above-described cases where all of the remaining sheets is plain paper. FIGS. 8A, 8B, 8C, and 8D are tables each showing the required time T1 for each assignment pattern of remaining sheets to a first printing period and a second printing period when the remaining sheets to be printed includes three sheets of thick paper that are the last three sheets to be printed. For example, as depicted in FIG. 8A, when there are six sheets remaining to be printed and the remaining sheets include three sheets of plain paper and three sheets of thick paper, an appropriate assignment pattern may be such that three sheets of plain paper are assigned to a first printing period and the other three sheets of thick paper are assigned to a second printing period. As compared with this, when there are six sheets of plain paper remaining to be printed, an appropriate assignment pattern may be such that all six sheets of the remaining sheets are assigned to a first printing period and no sheet is assigned to a second printing period. As described above, an appropriate assignment pattern may be different depending on the sheet type.

Therefore, in the illustrative embodiment, in the printer 100, an appropriate assignment pattern of remaining sheets to the last two successive printing periods is determined based on the number of remaining sheets to be printed and the sheet type of the remaining sheets when the printer 100 operates in the intermittent mode and the number of remaining sheets to be printed becomes less than the particular threshold. The last two successive printing periods are adjacent to each other while a non-printing period occurs therebetween. Further, the length of a non-printing period is determined appropriate to the determined assignment pattern.

More specifically, the printer 100 stores an assignment pattern database ("DB") 321 in the ROM 32. As depicted in FIG. 9, the assignment pattern DB 321 stores one or more patterns showing how many sheets are assigned to a first printing period and how many sheets are assigned to a second printing period on remaining sheet number basis. The assignment pattern DB 321 stores records in each of which the number of remaining sheets on a sheet type basis and an assignment pattern of remaining sheets to a first printing period and a second printing period are associated with each other. The assignment pattern DB 321 stores such records on the basis of assignment pattern of remaining sheets to subsequent printing periods according to the sheet type.

Figure 10:
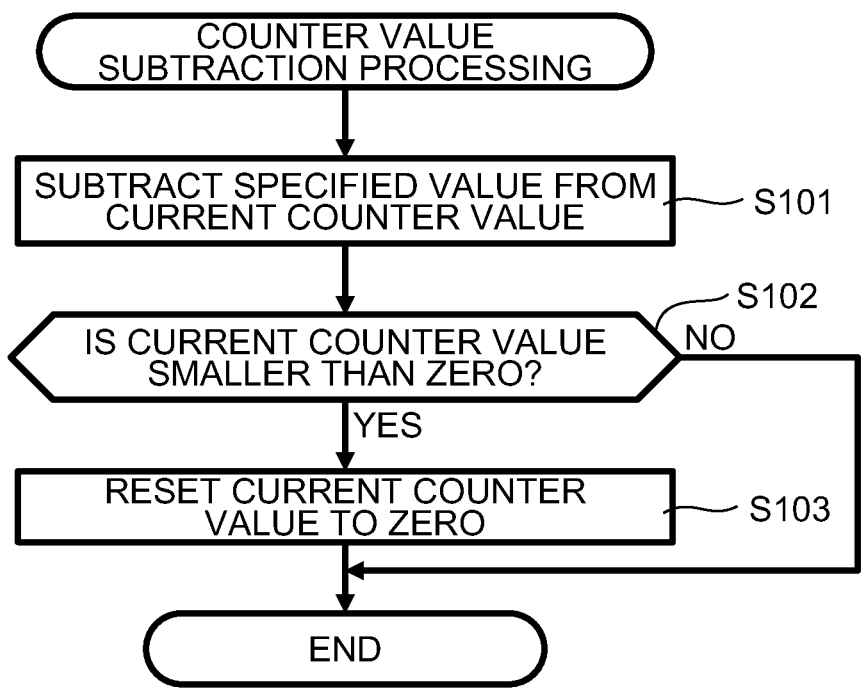
FIG. 10 is a flowchart depicting counter value subtraction processing in the illustrative embodiment according to one or more aspects of the disclosure.

Hereinafter, an operation of the printer 100 for implementing the intermittent mode will be described with reference to FIGS. 10 and 11. Referring to FIG. 10, counter value subtraction processing in which the counter value is subtracted will be described. The counter value subtraction processing is executed by the CPU 31 periodically during a non-printing period while executing a print job or during non-execution of any print job. In the illustrative embodiment, the counter value subtraction processing of FIG. 10 and printing processing of FIG. 11 are executed by the CPU 31. Nevertheless, in other embodiments, for example, the counter value subtraction processing of FIG. 10 and the printing processing of FIG. 11 may be executed by a single CPU, a plurality of CPUs, hardware (e.g., an ASIC), or a combination thereof (e.g., a combination of a CPU and an ASIC).

In the counter value subtraction processing, the CPU 31 subtracts a specified amount from the current counter value (e.g., step S101). Then, the CPU 31 determines whether the current counter value is smaller than zero ("0") (e.g., step S102). When the CPU 31 determines that the current counter value is smaller than zero ("0") (e.g., YES in step S102), it is estimated that the internal temperature of the printer 100 becomes approximately the same temperature as the internal temperature of the printer 100 at the time of beginning of a printing operation. Thus, the CPU 31 resets the counter value to zero ("0") (e.g., step S103). The value to be subtracted may be a fixed value greater than one ("1"). Subsequent to step S103, the CPU 31 ends the counter value subtraction processing.

When the CPU 31 determines that the current counter value is greater than or equal to zero ("0") (e.g., NO in step S102), it is estimated that the internal temperature of the printer 100 is higher than the internal temperature of the printer 100 at the time of beginning of a printing operation. Thus, the CPU 31 ends the counter value subtraction processing without resetting the counter value to zero ("0").

Referring to FIG. 11, the printing processing for controlling a printing operation of the printer 100 will be described. The CPU 31 starts the printing processing in response to the first reception of a print job since the printer gets activated. The printing processing causes the printer 100 to perform a printing operation starting with the non-intermittent mode.

In the printing processing, the CPU 31 causes the image forming unit 10 to print a single sheet (e.g., the first sheet) of one or more sheets expected to be printed (e.g., step S121). Then, the CPU 31 increase the counter value by a specified amount corresponding to printing of a single sheet (e.g., step S122).

Subsequent to step S122, the CPU 31 determines whether a print job have been completed (e.g., step S123). In step S123, when a plurality of print jobs are stacked, the CPU 31 determines whether all of the print jobs have been completed. When the CPU 31 determines that all of the one or more print jobs have been completed (e.g., YES in step S123), the CPU 31 ends the printing processing.

When the CPU 31 determines that all of the one or more print jobs have not been completed (e.g., NO in step S123), the CPU 31 determines whether the counter value is greater than the intermittent printing threshold (e.g., step S124). The intermittent printing threshold may be a level at which the printer 100 changes its operating mode from the non-intermittent mode to the intermittent mode and may be smaller than the printing inexecutable threshold. When the CPU 31 determines that the counter value is smaller than or equal to the intermittent printing threshold (e.g., NO in step S124), the CPU 31 keeps the operating mode of the printer 100 in the non-intermittent mode. Then, the routine proceeds to step S121 and the CPU 31 causes the image forming unit 10 to print another single sheet (e.g., the second sheet) (e.g., step 121).

When the CPU 31 determines that the counter value is greater than the intermittent printing threshold (e.g., YES in step S124), the CPU 31 changes the operating mode of the printer 100 to the intermittent mode and continues the execution of the printing operation. That is, the printer 100 changes its operating mode to the intermittent mode from the non-intermittent mode before the counter value reaches the printing inexecutable threshold. In the intermittent mode, the CPU 31 determines whether the number of remaining sheets to be printed is smaller than an assignment threshold (e.g., step S141). The assignment threshold may be a reference used for determining whether an assignment pattern of the remaining sheets is determined.

In the illustrative embodiment, for example, in a case where all sheets to be used for printing is plain paper, as depicted in FIG. 4A, the time required for printing a single sheet is the shortest when the number of sheets to be printed in a printing period is set to five sheets. Therefore, in the intermittent mode, a non-printing period of 30 seconds and a printing period of certain seconds for printing five sheets repeat alternately while a default value for the number of sheets to be printed in a printing period is set to five sheets. As depicted in FIG. 5, there is an appropriate assignment pattern of remaining sheets to the last two successive printing periods. Thus, the assignment threshold is set to, for example, 10 sheets, which is a total number of sheets to be printed in the last two printing periods when the number of sheets to be printed is set to the default value. The CPU 31 determines an assignment pattern of remaining sheets to be printed appropriate to the number of remaining sheets. The number of remaining sheets includes the number of sheets remaining in the currently executed print job and the number of sheets to be printed in one or more subsequent print jobs.

When the CPU 31 determines that the number of remaining sheets is greater than or equal to the assignment threshold (e.g., NO in step S141), as described above, the CPU 31 causes the image forming unit 10 to perform printing while the printer 100 is in intermittent mode and the number of sheets to be printed in a printing period is set to the default value. That is, when a non-printing period occurs currently, the CPU 31 waits until the non-printing period ends. When a printing period occurs currently, the CPU 31 causes the image forming unit 10 to perform printing of a single sheet (e.g., step S151). Upon completion of printing of particular number of sheets assigned to the printing period, the CPU 31 waits again until a non-printing period subsequent to the printing period ends. The processing of step S151 is an example of one of intermittent printing processing and intermittent printing step. The CPU 31 increases the counter value by the specified amount every time printing of a single sheet in step S151 is completed (e.g., step S152).

Subsequent to step S152, the CPU 31 determines whether an error that causes an interruption of printing at the image forming unit 10 (hereinafter, referred to as "printing interruption error") has occurred (e.g., step S153). The factors that cause the interruption of printing may include, for example, paper jam, the necessity of replacement of consumable items, or opening of a cover. For example, when printing is interrupted with the heater of the fixing unit 8 stopping generating heat, the internal temperature of the printer 100 lowers as time elapses. In response to this, the CPU 31 subtracts the specified amount from the current counter value as time elapses. When the CPU 31 determines that a printing interruption error has occurred (e.g., YES in step S153), the CPU 31 waits for error recovery (e.g., step S154). Then, the routine returns to step S124 and the CPU 31 determines again whether the counter value is greater than the intermittent printing threshold (e.g., S124).

When the CPU 31 determines that a printing interruption error has not occurred (e.g., NO in step S153), the routine proceeds to step S141. Until the number of sheets remaining becomes less than the assignment threshold, printing is performed while the number of sheets to be printed in a printing period is set to the default value and the printer 100 is in the intermittent mode. More specifically, a non-printing period of 30 seconds and a printing period of certain seconds for printing five sheets repeat alternately.

When the CPU 31 determines that the number of sheets remaining is less than the assignment threshold (e.g., YES in step S141), the CPU 31 determines the number of sheets to be printed in each of a first printing period and a second printing period referring to the assignment pattern DB 321 of FIG. 9 (e.g., step S142). That is, the CPU 31 determines how many sheets are assigned to each printing period. The processing of step S142 is an example of one of assignment pattern determination processing and assignment pattern determination step.

The CPU 31 determines the length of each non-printing period that occurs prior to a corresponding one of the first and second printing periods appropriately (e.g., step S143). The printer 100 also stores, in the ROM 32, information in which the number of sheets to be printed in a printing period and the required length of a non-printing period are associated with each other on sheet type basis as depicted in FIGS. 4A and 4B. In step S143, the CPU 31 determines, based on the information, the length of each non-printing period that occurs prior to a corresponding one of the first and second printing periods. The processing of step S143 is an example of one of period length determination processing and period length determination step.

When sheets of different types are assigned to the same printing period, the CPU 31 determines the number of sheets to be printed in the printing period and the length of a non-printing period prior to the printing period on the presumption that printing is performed in the printing period according to the settings of one of the sheet types that requires longer time in one cycle of intermittent printing. As depicted in FIGS. 4A and 4B, thick paper requires more time in one cycle of intermittent printing. For example, when one or more sheets of plain paper and one or more sheets of thick paper are assigned to the same printing period, the CPU 31 determines the number of sheets to be printed in the printing period and the length of a non-printing period prior to the printing period on the presumption that printing is performed on sheets of thick paper in the printing period.

In step S142, when the remaining sheets are inequally assigned to a first printing period and a second printing period, e.g., when there are seven sheets remaining to be printed and four sheets of the remaining sheets are assigned to one of the first and second periods and the other three sheets are assigned to the other of the first and second printing periods, more sheets are assigned to an earlier printing period (e.g., the first printing period). Assigning more sheets to the earlier printing period may enable the currently executing job to be completed at earlier timing, thereby enabling more jobs to be completed at earlier timing.

Subsequent to step S143, the CPU 31 causes the image forming unit 10 to perform printing in accordance with the determination made in steps S142 and S143. That is, similar to steps S151 and S152, the CPU 31 causes the image forming unit 10 to print a single sheet in the intermittent mode (e.g., step S161), and then increase the counter value by a specified amount corresponding to printing of a single sheet (e.g., step S162).

Subsequent to step S143, the CPU 31 determines whether a printing interruption error has occurred (e.g., step S163). When the CPU 31 determines that a printing interruption error has occurred (e.g., YES in step S163), the CPU 31 waits for error recovery (e.g., step S154). Then, the routine returns to step S124 and the CPU 31 determines again whether the counter value is greater than the intermittent printing threshold (e.g., S124).

When the CPU 31 determines that a printing interruption error has not occurred (e.g., step S163 NO in), the CPU 31 determines whether the number of waiting print jobs has been changed (e.g., increased or decreased) due to any reason other than completion of a print job (e.g., step S164). When the printer 100 receives one or more new print jobs, the number of waiting print jobs increases. When one or more waiting print jobs are canceled, the number of waiting print jobs decreases. When the number of waiting print jobs has been changed, the number of remaining sheets to be printed changes from the value used in step S142 for determining the assignment pattern. Therefore, when the number of waiting print jobs has been changed due to any reason other than completion of a print job (e.g., YES in step S164), the routine proceeds to step S141 and the CPU 31 determines again an appropriate assignment pattern of remaining sheets based on the updated number of remaining sheets.

When the number of waiting print jobs has not been changed except the completion of a print job (e.g., NO in step S164), the CPU 31 determines whether all of the one or more print jobs has been completed (e.g., step S165). When a plurality of print jobs are stacked, the CPU 31 determines whether all of the plurality of print jobs have been completed. When the CPU 31 determines that all of the one or more print jobs have not been completed (e.g., NO in step S165), the routine proceeds to step S161 and the CPU 31 causes the image forming unit 10 to print a single sheet. When the CPU 31 determines that all of the one or more print jobs have been completed (e.g., YES in step S165), the CPU 31 ends the printing processing.

As described above, an assignment pattern of remaining sheets to be printed to successive printing periods appropriate to reduction of the time required for printing depends on the number of remaining sheets to be printed. The successive printing periods are adjacent to each other while a non-printing period occurs therebetween. Therefore, in the printer 100, the number of sheets to be printed in a first printing period and the number of sheets to be printed in a second printing period (e.g., an assignment pattern of remaining sheets to be printed) are determined according to the number of remaining sheets to be printed so as to end printing of all of the remaining sheets at an earlier timing, and the length of each non-printing period that occurs prior to a corresponding one of the first and second printing periods is further determined according to the determined assignment pattern. Thus, this control may enable reduction of a time required for a printing operation as compared with a case where the number of sheets to be printed in a printing period and the length of a non-printing period are both fixed.

While the disclosure has been described in detail with reference to example embodiments thereof, it is not limited to such examples. Various changes, arrangements and modifications may be applied to the detailed configuration without departing from the spirit and scope of the disclosure. For example, the image forming apparatus is not limited to a printer. The image forming apparatus may be any device including a printing function, such as a copying device, a facsimile device, or a multifunction device. According to the illustrative embodiment, the printer 100 is a color printer including the process units 50C, 50M, 50Y, 50K for respective colors. Nevertheless, in other embodiments, for example, the printer 100 may be a monochrome printer including a single process unit. The image forming method of the printer 100 is not limited to an electrophotographic method. In other embodiments, for example, the image forming method of the printer 100 may an inkjet method.

The values indicated in FIGS. 4A, 4B, 5A-5D, and 8A-8D are merely examples. The values indicating the number of sheets to be printed in a printing period and the values indicating the length of a non-printing period are not limited to the values indicated in FIGS. 4A, 4B, 5A-5D, and 8A-8D. That is, the values indicating the number of sheets to be printed in a printing period and the values indicating the length of a non-printing period may be different among devices or models. The appropriate assignment pattern may also be different among devices or models.

In the illustrative embodiment, the conditions for performing printing in the intermittent mode include that the counter value increased by a specified amount every time a single sheet is printed has a greater value than the intermittent printing threshold. Nevertheless, the conditions for performing printing in the intermittent mode is not limited to that example. In other embodiments, for example, the conditions may include one or more of conditions, for example, that the internal temperature of the printer 100 is a specified temperature or higher, a predetermined or more number of sheets have been printed, and an execution instruction to perform intermittent printing has been inputted by a user.

In the illustrative embodiment, an assignment pattern of remaining sheets to be printed is determined based on sheet type. Nevertheless, in other embodiments, an assignment pattern of remaining sheets to be printed may be determined based on one or more other printing conditions, for example, sheet size, color settings, printing side settings (e.g., single sided printing or double sided printing), and resolution. These printing conditions may contribute to variation in the time required for printing a single sheet. Therefore, the assignment pattern of remaining sheets to subsequent printing periods may be determined based on the print settings described above. In other embodiments, for example, the assignment pattern of remaining sheets to subsequent printing periods may be determined based on at least the number of remaining sheets to be printed. The print conditions, e.g., the sheet type, might not necessarily be taken into consideration. However, if the print conditions are taken into consideration, the time required for printing may be reduced more.

In the illustrative embodiment, the assignment threshold is set to the value which is twice as much as the default value of the maximum number of sheets to be printed in a printing period, and the assignment pattern of remaining sheets to the last two successive printing periods is determined. Nevertheless, the value which is set for the assignment threshold is not limited to that example and the number of printing periods to which the remaining sheets are assigned is not limited to two printing periods. For example, a value that is greater than the value set to the assignment threshold in the illustrative embodiment may be specified to the assignment threshold and the remaining sheets may be assigned to three or more printing periods.

In the illustrative embodiment, the assignment pattern of remaining sheets to be printed is determined when the value indicating the number of sheets remaining becomes smaller than the assignment threshold. Nevertheless, the timing when the assignment pattern is determined is not limited to that example. For example, upon receipt of a new print job, the CPU 31 may determine, based on the total number of sheets to be printed, whether the operating mode of the printer 100 needs to be changed to the intermittent mode. When the CPU 31 determines that the operating mode of the printer 100 needs to be changed to the intermittent mode, the CPU 31 may determine an assignment pattern of remaining sheets to subsequent printing periods at that time.

In the illustrative embodiment, when the number of waiting print job has been changed or when an error that the heater of the fixing unit 8 unexpectedly stops generating heat has occurred, the CPU 31 redetermines an appropriate assignment pattern of remaining sheets to be printed based on the updated number of remaining sheets. Nevertheless, in other embodiments, for example, it might not necessary to redetermine an appropriate assignment pattern even when such a situation occurs. That is, the processing of steps S163, S164, and S153 may be omitted. However, if an appropriate assignment pattern is redetermined when such a situation occurs, the time required for printing may be reduced more. The error that is identified in step S163 or S153 is not limited to the error that the heater of the fixing unit 8 unexpectedly stops generating heat. In other embodiments, for example, the error that is identified in step S163 or S153 may be an error that the heater of the fixing unit 8 fails to stop generating heat.

The processing described above may be executed by, for example, a single CPU, a plurality of CPUs, hardware (e.g., an ASIC), or a combination thereof (e.g., a combination of a CPU and an ASIC). Further, the processing described above may be implemented in various manners, such as, for example, by executing one or more programs stored on non-transitory computer-readable storage media or by performing methods implementing the above-described processing.

According to the aspects of the disclosure, the technique for reducing a time required for a printing operation performed by the image forming apparatus capable of performing intermittent printing may be implemented. Some embodiments of the disclosure provide for a technique for reducing a time required for a printing operation performed by an image forming apparatus capable of performing intermittent printing.

What is claimed is:

1. An image forming apparatus comprising:
an image forming unit; and
a controller configured to:
receive a print job;
determine whether a number of sheets remaining to be printed in the print job is smaller than an assignment threshold; and
when the controller determines that the number of sheets remaining to be printed in the print job is smaller than the assignment threshold:
cause the image forming unit to perform printing in printing periods after respective non-printing periods during which the image forming unit does not perform printing, wherein the printing periods and the non-printing periods occur alternately;
determine a number of sheets to be printed in each of the printing periods in accordance with the number of sheets remaining to be printed in the print job; and
determine a length of each of the non-printing periods in accordance with the determined number of sheets to be printed in each of the printing periods.

2. The image forming apparatus according to claim 1, wherein the controller is further configured to determine the number of sheets to be printed in each of the printing periods in accordance with the number of sheets remaining to be printed in the print job and one or more printing conditions of the print job.

3. The image forming apparatus according to claim 1, wherein the controller is further configured to set the number of sheets to be printed in each of the printing periods to a first particular number when the number of sheets remaining to be printed is equal to or greater than a predetermined number.

4. The image forming apparatus according to claim 3, wherein the controller is further configured to set the number of sheets to be printed in each of the printing periods to a second particular number which is greater than the first particular number when the number of sheets remaining to be printed is smaller than a predetermined number.

5. The image forming apparatus according to claim 1, wherein the controller is further configured to, when the controller determines the different number of sheets to be printed in a former printing period from the number of sheets to be printed in a latter printing period among the printing periods, set the number of sheets to be printed in the former printing period to the number which is greater than the number of sheets to be printed in the latter printing period.

6. The image forming apparatus according to claim 1, wherein the controller is further configured to, after the controller determines the number of sheets to be printed in each of the printing periods and before the completion of the printing of all the remaining sheets to be printed, in response to receipt of one or more new print jobs or cancellation of a part of the print job, determine again the number of sheets to be printed in each of the printing periods in accordance with the number of sheets remaining to be printed.

7. The image forming apparatus according to claim 1, wherein, after the controller determines the number of sheets to be printed in each of the printing periods and before the completion of the printing of all the remaining sheets to be printed, the controller is further configured to, when the controller determines a printing interruption error has occurred, determine again the number of sheets to be printed in each of the printing periods in accordance with the number of sheets remaining to be printed.

8. The image forming apparatus according to claim 1, wherein the controller is further configured to, when a condition for performing printing is satisfied, determine the number of sheets to be printed in each of the printing periods in accordance with the number of sheets remaining to be printed.

9. The image forming apparatus according to claim 1, further comprising:
a memory storing information in which each number of sheets remaining to be printed, reference number of sheets to be printed in each of the printing periods and a reference length of each of the non-printing periods are associated with each other, wherein the controller is configured to determine, based on the information stored in the memory, the number of sheets to be printed in each of the printing periods and the length of each of the non-printing periods, the each of the non-printing periods being prior to a corresponding one of the printing periods.

10. The image forming apparatus according to claim 1, further comprising:

a memory storing information in which each number of sheets of each sheet type remaining to be printed, reference number of sheets to be printed in each of the printing periods and a reference length of each of the non-printing periods are associated with each other, wherein the controller is configured to determine, based on the information stored in the memory and each number of sheets of each sheet type remaining to be printed in the print job, the number of sheets to be printed in each of the printing periods and the length of each of the non-printing periods, the each of the non-printing periods being prior to a corresponding one of the printing periods.

11. The image forming apparatus according to claim 1, wherein the controller comprises:

a processor; and
a memory storing processor-executable instructions.

12. The image forming apparatus according to claim 1, wherein the print job includes a currently executed print job and all subsequent print jobs, and wherein the controller determines the number of sheets remaining to be printed in the print job by adding a number of sheets remaining to be printed in the currently executed print job and a number of sheets remaining to be printed in the all subsequent print jobs.

13. The image forming apparatus according to claim 1, wherein the controller is further configured to:

determine the number of sheets to be printed in each of the printing periods in accordance with a required time for performing printing of the number of sheets remaining to be printed in the print job; and determine the length of each of the non-printing periods in accordance with the required time for performing printing of the number of sheets remaining to be printed in the print job.

14. A printing apparatus comprising:

a printing device configured to perform printing of a plurality of sheets in an intermittent printing mode in which the plurality of sheets are printed within two or more of a variable printing cycle, wherein the variable printing cycle comprises:

a non-printing period having a variable length during which the printing device does not perform printing; and a printing period subsequent to the non-printing period, wherein in the printing period the printing device prints a variable number of the plurality of sheets; and a controller configured to perform an assignment pattern determination process for assigning one pattern of a plurality of patterns for the printing device to print the plurality of sheets within the two or more of the variable printing cycle, wherein a required time for performing printing of the plurality of sheets under each of the plurality of patterns varies based on a first number of sheets to be printed in a printing period of a first variable printing cycle, a second number of sheets to be printed in a printing period of a second variable printing cycle, a length of a non-printing period of the first variable printing cycle, and a length of a non-printing period of the second variable printing cycle, and wherein the controller is configured to assign the one pattern of the plurality of patterns such that the one pattern has the shortest required time for performing printing of the plurality of sheets amongst the required times for performing printing under the plurality of patterns.

15. The printing apparatus according to claim 14, wherein the assignment pattern determination process comprises:

determining a first number of sheets of the plurality of sheets to be printed in a printing period of a first variable printing cycle;

determining a second number of sheets of the plurality of sheets to be printed in a printing period of a second variable printing cycle based on the determined first number of sheets to be printed in the printing period of the first variable printing cycle;

determining a length of a non-printing period of the first variable printing cycle based on the determined first number of sheets to be printed in the printing period of the first variable printing cycle; and determining a length of a non-printing period of the second variable printing cycle based on the determined second number of sheets to be printed in the printing period of the second variable printing cycle.

16. The printing apparatus according to claim 14, further comprising:

a memory storing information on at least:
a variable number of sheets making up the plurality of sheets;

the one pattern for the printing device to print the variable number of sheets, wherein the one pattern comprises:

a number of sheets to be printed in a printing period of a first variable printing cycle for printing the variable number of sheets; and a number of sheets to be printed in a printing period of a second variable printing cycle for printing the variable number of sheets, wherein the controller is configured to assign the one pattern based on the information stored in the memory.

17. The printing apparatus according to claim 16, wherein the memory further storing information on:

a length of a non-printing period of the first variable printing cycle for printing the variable number of sheets; and a length of a non-printing period of the second variable printing cycle for printing the variable number of sheets, wherein the controller is configured to assign the one pattern and determine the length of the non-printing period of the first variable printing cycle for printing the variable number of sheets and the length of the non-printing period of the second variable printing cycle for printing the variable number of sheets based on the information stored in the memory.

18. An image forming apparatus comprising:
an image forming unit;
a controller configured to:
receive a print job;

cause the image forming unit to perform printing in printing periods after respective non-printing periods during which the image forming unit does not perform printing, wherein the printing periods and the non-printing periods occur alternately;

determine a number of sheets to be printed in each of the printing periods in accordance with a number of sheets remaining to be printed in the print job, wherein, when printing periods include a first printing period and a second printing period, the controller is configured to determine a number of sheets to be printed in the first printing period and is configured to determine a number of sheets to be printed in the second printing period which is in relation to the determined number of sheets to be printed in the first printing period; and determine a length of each of the non-printing periods in accordance with the determined number of sheets to be printed in each of the printed periods; and a memory storing a counter value, wherein the controller is further configured to:

increase the counter value by a specified amount every time a single sheet is printed during the printing period and to decrease the counter value by a specified amount periodically during the non-printing period, determine whether the number of sheets remaining to be printed in the print job is smaller than an assignment threshold;

determine, when the controller determines that the number of sheets remaining to be printed in the print job is smaller than the assignment threshold:

the number of sheets to be printed in the printing period in accordance with the number of sheets remaining to be printed; and the length of the non-printing period in accordance with the determined number of sheets to be printed in the printing period; and cause the image forming unit to perform printing in the printing period after the non-printing period in accordance with the determined number of sheets to be printed in the printing period and the determined length of the non-printing period.

19. The printing apparatus according to claim 18, wherein the controller is further configured to determine whether the counter value is greater than an intermittent printing threshold; and wherein, when the controller determines that the counter value is greater than the intermittent printing threshold, the controller is configured to determine whether the number of sheets remaining to be printed in the print job is smaller than the assignment threshold.

20. The printing apparatus according to claim 18, wherein the controller is further configured to:

determine the number of sheets to be printed in each of the printing periods in accordance with the number of sheets remaining to be printed in the print job and in accordance with a required time for performing printing of the number of sheets remaining to be printed in the print job; and determine the length of each of the non-printing periods in accordance with the determined number of sheets to be printed in each of the printing periods and in accordance with the required time for performing printing of the number of sheets remaining to be printed in the print job.

21. A method comprising:

providing an image forming unit;

providing a controller;

determining a plurality of possible assignment patterns for assigning a remaining number of sheets to be printed by the image forming unit, wherein each of the plurality of possible assignment patterns comprises a plurality of cycles, wherein each of the plurality of cycles comprises:

a printing period during which a variable portion of the remaining number of sheets to be printed is printed, wherein a variable length of the printing period corresponds to the number of sheets to be printed during the printing period; and a non-printing period during which no sheet is printed, wherein a variable length of the non-printing period corresponds to the number of sheets to be printed during the printing period, wherein a required time for each cycle comprises a total of the variable length of the printing period and the variable length of the non-printing period, and wherein a required time for a possible assignment pattern in the plurality of possible assignment patterns comprises a total of the required time for each cycle in the possible assignment pattern;

selecting one of the possible assignment patterns based on a comparison of the required time for each of the plurality of possible assignment patterns;

associating the selected possible assignment pattern with the remaining number of sheets to be printed; and configuring the controller to:

receive a print job including a total number of sheets to be printed;

during printing of the total number of sheets to be printed, determine whether the remaining number of sheets to be printed out of the total number of sheets to be printed is smaller than an assignment threshold;

in response to determining that the remaining number of sheets to be printed is smaller than the assignment threshold, retrieve the selected possible assignment pattern associated with the remaining number of sheets to be printed; and control the image forming unit to print the remaining number of sheets based on the selected possible assignment pattern.

* * * * *